P. W. Thomson.
Wheel Cultivator.
N° 41,550.   Patented Feb. 9, 1864.
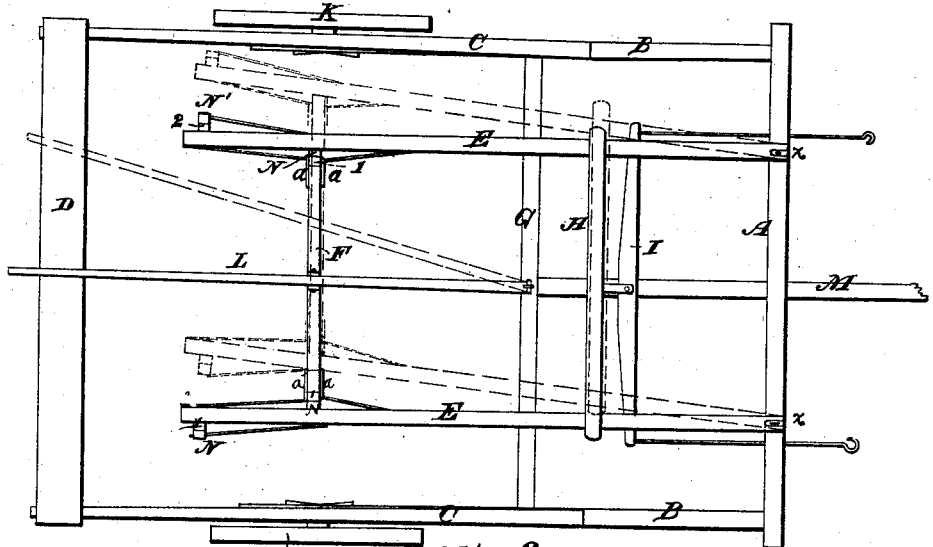
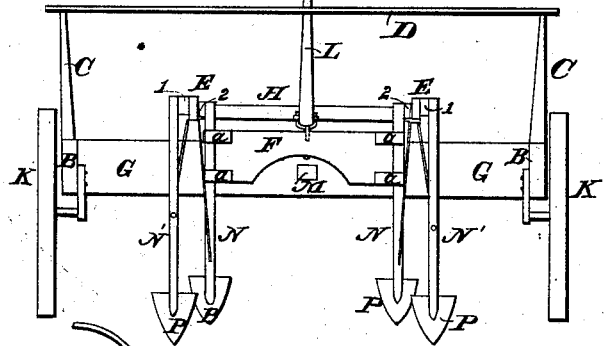
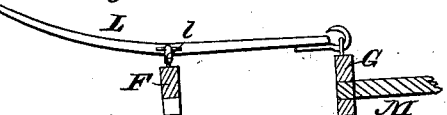
WITNESSES:
L. L. Coburn
J. J. French
INVENTOR:
P. W. Thomson
by W. E. Mans, attorney

UNITED STATES PATENT OFFICE.

P. W. THOMSON, OF TRURO, ILLINOIS.

IMPROVEMENT IN CULTIVATORS.

Specification forming part of Letters Patent No. 41,550, dated February 9, 1864.

*To all whom it may concern:*

Be it known that I, P. W. THOMSON, of Truro, in the county of Knox and State of Illinois, have invented a new and useful Improvement in Cultivators; and I do hereby declare that the following is a full, clear, and exact description thereof, reference being had to the accompanying drawings and the letters and figures marked thereon, which form a part of this specification.

The nature of my invention consists of such a novel arrangement of a sulky-cultivator that the part of the frame to which the plow-standards are attached can be readily thrown either vertically or laterally or in any direction by the operator by means of a single lever, thus enabling him to perform the labor better with a cheaper machine and with less risk of injury to the grain cultivated.

To enable others skilled in the art to manufacture and use my invention, I will proceed to describe fully its construction and operation.

Figure 1 represents a top view of my improved cultivator. Fig. 2 represents a rear view thereof. Fig. 3 represents the lever with which the movable part of the cultivator is operated, showing also its attachments. Fig. 4 more plainly shows the cross-piece H.

The same letters represent corresponding parts in the different figures.

M represents the tongue of my cultivator, which passes through the front cross-bar, A, and is firmly fastened to the rear cross-piece of the main frame G.

B B are the side pieces of the frame, the rear ends of which are supported by the wheels K K, and to them one end of the springs C C of the seat D are firmly attached.

E E are plow-beams to which the plow-standards are attached, and are fastened to the frame of the cultivator only at $x\ x$, and there by means of a pivot-joint allowing of free motion. The front plow-standards, N N, are fastened to the inside of the beams E E, and the rear plow-standards, N' N', are fastened on the outside, and are gaged to the proper relative position for doing the work, when the beams are not thick enough for that purpose, by means of the pieces 1 1 2 2, as shown in the drawings.

F is a cross-piece between the standards N N, and is fastened to them by means of the bands $a\ a$ passing around them, as shown in Fig. 2, thus allowing the standards to turn in the bands when a lateral motion is given to the plows. The lever L is attached to the cross-bar G by a method which allows it to move laterally or vertically, and is also attached to F, as shown in Fig. 3, the pin $c$ vibrating in slot $l$ in case of lateral motion.

H is slotted at the ends, and is fastened to the beams E E with pins, as shown in Fig. 4, or it may be fastened in any that will allow of the lateral motion, as shown by the red lines in Fig. 1.

The operator, sitting on the seat D, can by means of the lever L completely control the plows, readily throwing either vertically or laterally, or obliquely if he may wish so to do.

Having thus described my improved cultivator, what I claim as my invention, and desire to secure by Letters Patent, is—

The combination and arrangement of the plow-beams E E, pivoted at $x\ x$, the standards N N, the cross-bar F, provided with the bands $a\ a$, and lever L, all constructed and operating substantially as and in the manner set forth.

P. W. THOMSON.

Witnesses:
WM. MCGOWAN,
CHARLES N. BUTT.